United States Patent
Long et al.

(10) Patent No.: US 9,284,962 B2
(45) Date of Patent: Mar. 15, 2016

(54) VARIABLE GEOMETRY LIFT FAN MECHANISM

(71) Applicant: Zee.Aero Inc., Mountain View, CA (US)

(72) Inventors: Geoffrey A. Long, Half Moon Bay, CA (US); Rodin Lyasoff, San Francisco, CA (US)

(73) Assignee: Zee.Aero Inc., Mountain View, CA (US)

( * ) Notice: Subject to any disclaimer, the term of this patent is extended or adjusted under 35 U.S.C. 154(b) by 627 days.

(21) Appl. No.: 13/804,527

(22) Filed: Mar. 14, 2013

(65) Prior Publication Data

US 2015/0132104 A1    May 14, 2015

Related U.S. Application Data

(60) Provisional application No. 61/693,172, filed on Aug. 24, 2012.

(51) Int. Cl.

| F04D 19/02 | (2006.01) |
|---|---|
| B64C 11/00 | (2006.01) |
| B64C 11/16 | (2006.01) |
| B64C 11/28 | (2006.01) |
| B64C 27/20 | (2006.01) |

(52) U.S. Cl.
CPC ............... F04D 19/02 (2013.01); B64C 11/00 (2013.01); B64C 11/16 (2013.01); B64C 11/28 (2013.01); B64C 27/20 (2013.01)

(58) Field of Classification Search
CPC ....... F04D 19/02; B64C 27/20; B64C 27/022; B64C 11/16; B64C 11/00; B64C 11/28

USPC .............................. 416/142, 143, 131, 132 R
See application file for complete search history.

(56) References Cited

U.S. PATENT DOCUMENTS

| 3,625,631 | A | * | 12/1971 | Covington et al. ................ 416/1 |
|---|---|---|---|---|
| 3,995,793 | A | * | 12/1976 | Wing ............................. 244/7 R |
| 4,793,572 | A | | 12/1988 | Mecca |
| 5,211,538 | A | | 5/1993 | Seghal et al. |
| 6,622,962 | B1 | | 9/2003 | White |
| 2008/0272226 | A1 | * | 11/2008 | Colclough ........................ 244/2 |

(Continued)

FOREIGN PATENT DOCUMENTS

| CN | 1062876 A | 7/1992 |
|---|---|---|
| CN | 201385780 Y | 1/2010 |

(Continued)

OTHER PUBLICATIONS

PCT International Search Report and Written Opinion, PCT Application No. PCT/US2013/056527, Dec. 2, 2013, fourteen pages.

(Continued)

*Primary Examiner* — Justin Jonaitis
*Assistant Examiner* — Stephen Mick
(74) *Attorney, Agent, or Firm* — Fenwick & West LLP (57) ABSTRACT

A vertical takeoff and landing aircraft includes rotors that provide vertical and horizontal thrust. During forward motion, the vertical lift system is inactive. A lift fan mechanism positions the fan blades of the aircraft in a collapsed configuration when the vertical lift system is inactive and positions the fan blades of the aircraft in a deployed configuration when the vertical lift system is active.

21 Claims, 8 Drawing Sheets

(56) References Cited

U.S. PATENT DOCUMENTS

| | | | |
|---|---|---|---|
| 2009/0097973 A1* | 4/2009 | Cabrera et al. | 416/1 |
| 2010/0135805 A1* | 6/2010 | Muylaert et al. | 416/135 |
| 2010/0264260 A1* | 10/2010 | Hammerquist | 244/49 |
| 2011/0293426 A1* | 12/2011 | Fucks et al. | 416/147 |

FOREIGN PATENT DOCUMENTS

| | | |
|---|---|---|
| CN | 101723087 A | 6/2010 |
| CN | 102556336 A | 7/2012 |

OTHER PUBLICATIONS

New Zealand Intellectual Property Office, Examination Report, New Zealand Patent Application No. 629367, Jun. 9, 2015, two pages.

State Intellectual Property Office of the People's Republic of China, First Office Action, Chinese Patent Application No. 2013800540361, Feb. 11, 2015, seventeen pages.

\* cited by examiner

FIG. 1

FIG. 2 collapsed configuration:

FIG. 3A deployed configuration:

VARIABLE GEOMETRY LIFT FAN MECHANISM

CROSS-REFERENCE TO RELATED APPLICATIONS

This application claims priority to U.S. Provisional Patent Application No. 61/693,172 filed on Aug. 24, 2012, which is incorporated by reference in its entirety.

BACKGROUND

Field

Described embodiments relate to a variable geometry lift fan mechanism for a powered-lift aircraft.

Aircraft may use fixed wings, such as in a conventional airplane, rotary wings, such as in a helicopter, or a combination of fixed wings and rotary wings. Powered-lift aircraft, which derive lift in some flight regimes from rotary wings and in others from fixed wings, are desirable because they are able to perform very short or vertical takeoffs and landings. A powered-lift aircraft may have rotary wings, or rotors, that provide both vertical and horizontal thrust. Other types of powered-lift aircraft have one or more rotors (lift fans) for vertical thrust, and one or more rotors (propellers) for horizontal thrust. In some powered-lift aircraft the lift fans are inactive during forward flight.

In a powered-lift aircraft with lift fans, the fans may have four or more blades to provide the needed lift at rotational speeds while still allowing for quiet operation. The fan blades may have large chords and can be highly twisted. When the fan blades are stationary, these types of fans produce large amounts of aerodynamic drag due to flow separation and large frontal area from the blades. This reduces the performance of the aircraft. If the individual fan blades are aligned with the flow direction of air across the aircraft, both the frontal area and flow separation are reduced resulting in lower drag. While a two-bladed fan can be stopped with the blades aligned in the flow direction, this is not possible with fans of more than two blades.

SUMMARY

The embodiments herein disclose embodiments of a lift fan of a powered-lift aircraft. The lift fan of the aircraft can be configured to transition from a deployed configuration to a collapsed configuration and vice versa. In one embodiment, the deployed configuration of a lift fan corresponds to the best orientation of the fan blades of the lift fan for producing thrust. For example, 90 degree spacing between the blades of a four-bladed fan may correspond to a deployed configuration of a lift fan. The collapsed configuration of the lift fan describes the orientation of the fan blades of the lift fan when thrust is no longer needed. According to one embodiment, the collapsed configuration reduces the frontal area of the lift fan and the drag produced by the lift fan in forward flight by positioning the fan blades of the lift fan to be in-line with each other. Additionally, the collapsed configuration may reduce the overall width of the aircraft allowing for easier transport and storage.

In one embodiment, a mechanism is employed to move the blades of the lift fan between the deployed configuration and the collapsed configuration using the motor that drives the lift fan, obviating the need for additional motors and/or actuators. In some embodiments, the motor driving the lift fan is an electric motor. Alternatively, the motor driving the lift fan is a gasoline motor. In these embodiments, the torque of the electric motor can be precisely controlled and used to move the lift fan blades between the deployed and collapsed configurations. Mechanical stops may be incorporated into the blades of a lift fan. The position of the mechanical stops can be used to define the angle that the blades of the lift fan may rotate through with respect to one another in order to position the fan in the deployed configuration or the collapsed configuration. Friction and damping between the blades may be employed to affect the dynamics of the deploying and collapsing action and/or to resist rotation of the blades out of either the collapsed configuration or deployed configuration. Detents may also be included to mechanically or magnetically resist the rotation of the blades out of either the collapsed configuration or deployed configuration.

The features and advantages described in this summary and the following detailed description are not intended to be limiting. Many additional features and advantages will be apparent to one of ordinary skill in the art in view of the drawings, specification and claims.

BRIEF DESCRIPTION OF THE DRAWINGS

FIGS. 6A and 6B illustrate a lift fan that incorporates a deployment mechanism according to one embodiment.

The figures depict, and the detail description describes, various non-limiting embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
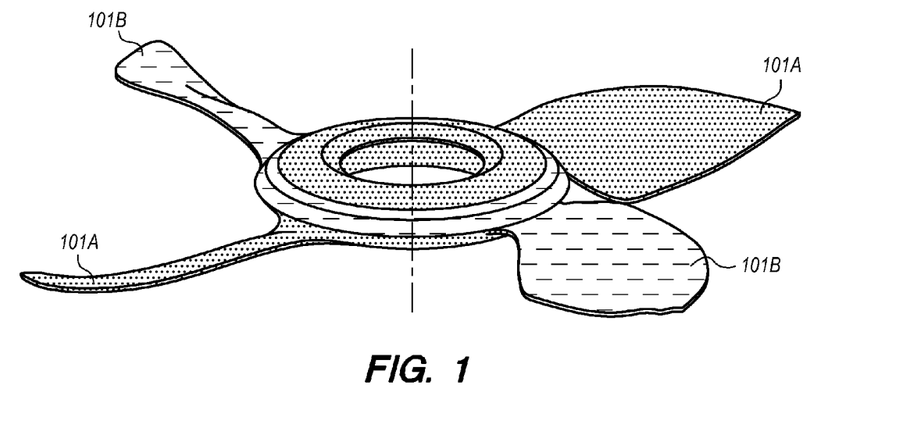
FIG. 1 illustrates a lift fan in a deployed configuration according to one embodiment.

FIG. 1 illustrates a lift fan of a powered-lift aircraft according to one embodiment. In the illustrated embodiment, the lift fan comprises a stack of two or more sets of one or two fan blades, where the total number of blades is equal to the number needed in a baseline fixed-blade fan. Particularly, FIG. 1 illustrates a stack of two two-blade sets, for a total of four fan blades. The configuration shown in FIG. 1 is referred to as the deployed configuration. In one embodiment, when the lift fan is producing thrust, the blades sets are rotated to their optimal thrust producing orientation as shown in FIG. 1. In FIG. 1, blade set 101A represents a driven set of blades that is attached to a drive source such as an electric motor and blade set 101B represents one or more additional following set of blades that are coupled to the driven blade set by a mechanism allowing motion about the axis of rotation. The following set of blade sets may include one additional set of blades or two or more additional set of blades. In the deployed configuration, a 90 degree spacing is configured between each fan blade for a four-blade fan system with a single following blade set 101B. However, in alternative embodiments the angle between the blades may be any angle greater than a stowed angle associated with a collapsed configuration and may include more than one following blade set.

Figure 2:
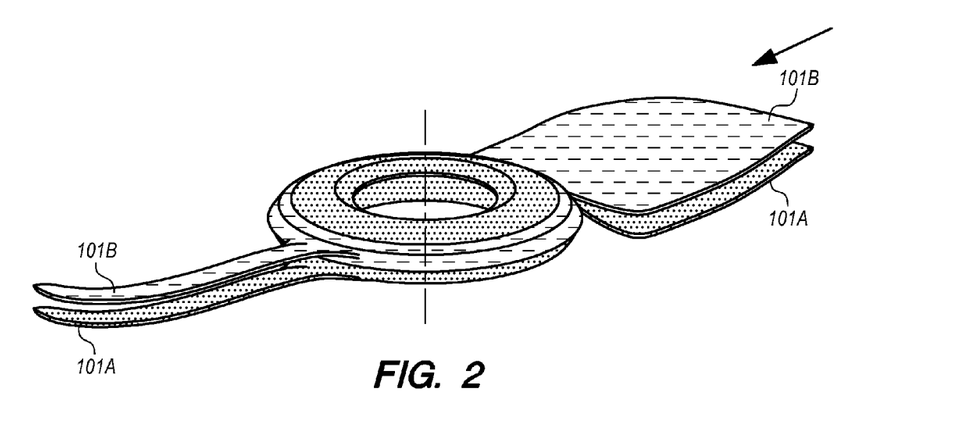
FIG. 2 illustrates the lift fan in a collapsed configuration according to one embodiment.

When thrust is no longer needed, e.g., during cruising flight or storage of the aircraft, the following blade set(s) 101B can be rotated to an embodiment of the collapsed configuration shown in FIG. 2. The collapsed configuration reduces the frontal area and aerodynamic drag of the fan because the position of the collapsed configuration is in line with the travel of the aircraft represented by the arrow in FIG. 2. Additionally, the collapsed configuration may reduce the overall width of the aircraft allowing for easier transport and storage. In the collapsed position, the driven blade set 101A and the following blade set 101B are positioned such that the fan blades of the driven blade set 101A and the following blade set 101B are in line with one another. That is, in the collapsed configuration a substantially zero-degree spacing (i.e., the stowed angle) is configured between a pair of fan blades of the lift fan.

The change from the deployed configuration to the collapsed configuration and vice-versa may be accomplished by several mechanisms. In one embodiment, a mechanism moves the following blade set(s) 101B between the deployed configuration and the collapsed configuration and vice-versa using the motor that powers the lift fan, and without the user of additional motors and/or actuators. In one embodiment, the following blade set(s) 101B of a lift fan pivot about the rotational axis of the driven blade set 101A within a range of relative motion defined by mechanical stops that are engaged in both the collapsed and deployed configurations. In one embodiment, the mechanical stops are incorporated into the driven blade set 101A and the following blade set(s) 101B. A retention torque may be applied to hold the following blade set(s) 101B against these mechanical stops so that aerodynamic or other disturbances do not cause the following blade set(s) 101B to bounce on the stops or move out of the desired configuration, such as the deployed configuration or the collapsed configuration. The retention torque may be generated by various means.

In one embodiment, adding friction to resist the relative motion between the driven blades set 101A and the following blade set(s) 101B generates the retention torque. The friction may be a fraction of the torque required to generate full thrust from the lift fan or may be a larger amount. In addition to providing the retention torque that maintains the following blade set(s) 101B in the deployed or collapsed configuration, the friction torque can be beneficial in reducing the impact when mechanical stops are engaged.

Figure 9:
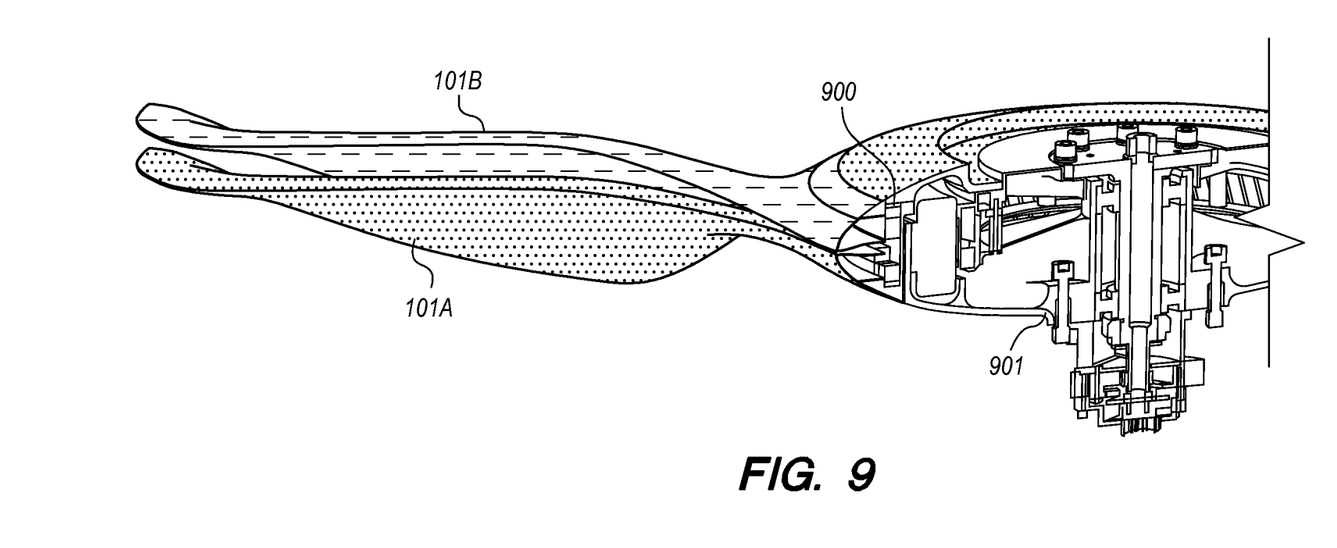
FIG. 9 is a cross-section view of a deployment mechanism of the lift fan in the collapsed configuration showing the friction ring according to one embodiment.

FIG. 9. Illustrates a friction ring 900 or pad that generates a retention friction torque. The friction ring 900 is located between the driven blade set 101A and the following blade set 101B. As the motor 901 accelerates the lift fan, axial thrust generated by the following blade set 101B is applied to the friction ring 900, which increases the friction generated by the friction ring 900 and tends to resist relative motion between the driven blade set 101A and following blade set 101B. The mechanism is designed such that the torque required to overcome the friction generated by the friction ring 900 is more than the maximum torque that the motor can apply when the lift fan is spinning in its normal operating range. In this case, deployment and retraction of the mechanism must occur at slower speeds when the friction torque is sufficiently low to allow relative motion.

Another embodiment is similar to the above-described mechanism, but includes damping between the driven blade set 101A and following blade set(s) 101B. The damping may be from a viscous fluid damper or any other damping method (magnetic eddy current damping, etc.). The damping is selected in order to speed or slow the deployment process and reduce the speed at which the following blade set(s) hit mechanical stops and to damp out bouncing on the stop.

Figure 3A:
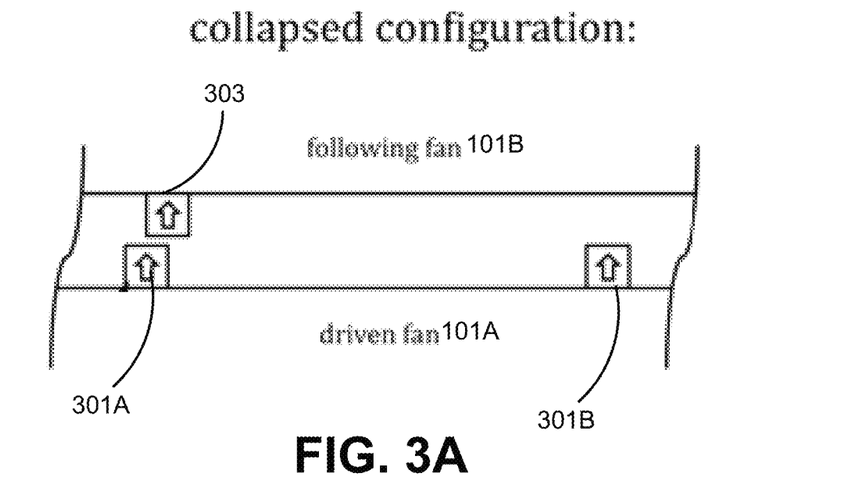
FIGS. 3A and 3B respectively illustrate detailed views of a lift fan deployment mechanism in the collapsed configuration and in the deployed configuration, using a magnetic detent according to one embodiment.

In one embodiment, a retention torque is generated using detents in the deployed and/or collapsed configurations. In one embodiment, a detent is a device used to mechanically resist the rotation of the following blade set(s) 101B relative to the driven blade set 101A. One type of detent is a magnetic detent, which uses the attraction of two magnets incorporated into the driven blade set 101A and the following blade set(s) 101B. FIG. 3A illustrates a detailed view of the position of magnets of the driven blade set 101A and the following blade set(s) 101B in the collapsed configuration according to one embodiment. Note that the driven blade set 101A and the following blade set(s) 101B may have more or fewer magnets than those shown in FIG. 3A. That is, the magnets 301A, 301B, and 303 may each be comprised of multiple magnets distributed around the mechanism.

Figure 3B:
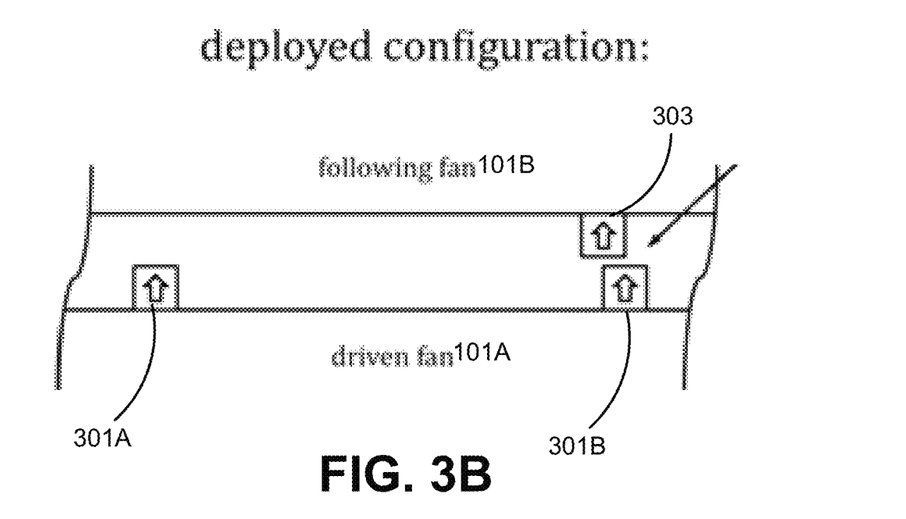
Figure 8:
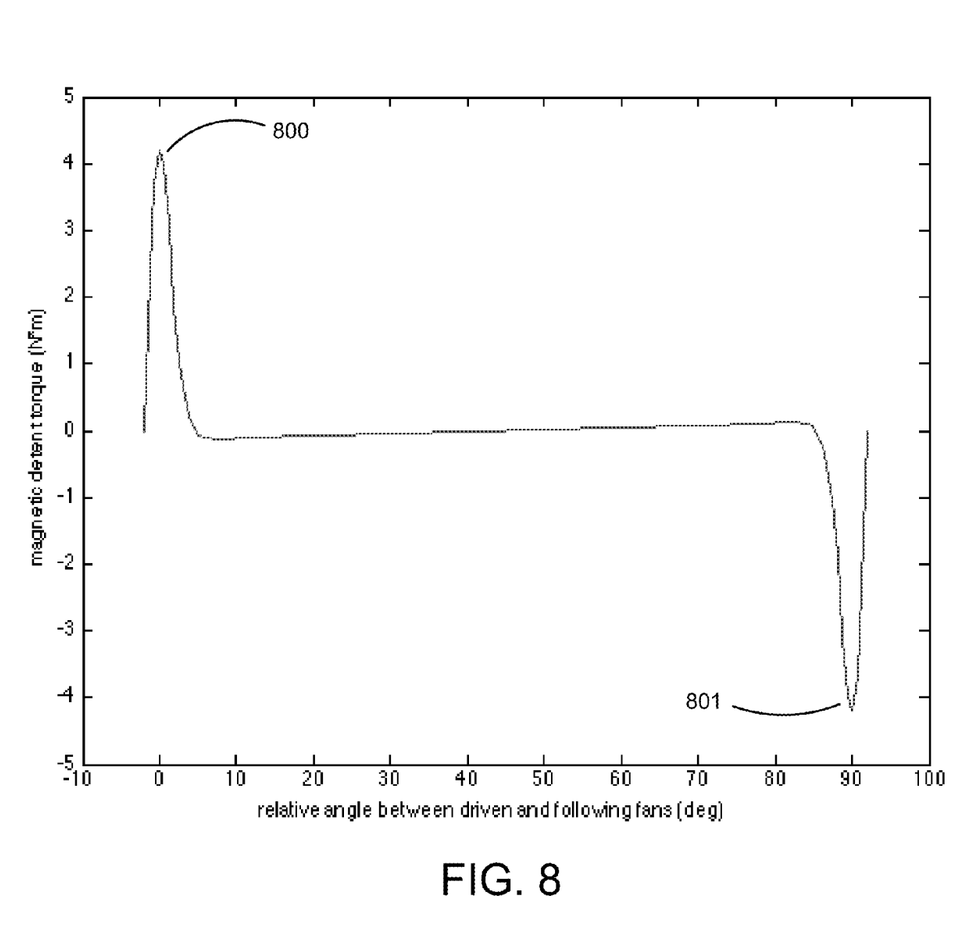
FIG. 8 is a plot of magnetic detent torque versus the relative angle between the driven blade set and the following blade set.

The driven blade set 101A contains magnets 301A and 301B in one embodiment. The following blade set(s) 101B includes a magnet 303. In one embodiment, the magnets 301A, 301B and 303 comprise neodymium (NdFeB) magnets. The arrows drawn on the magnets 301A, 301B and 303 in FIGS. 3A and 3B are drawn from the south pole of the magnet to the north pole of the magnet. A north pole of one magnet tends to be attracted to the south pole of another magnet. As shown in FIG. 3A, when in the collapsed configuration the magnet 303 on the following blade set(s) 101B is slightly offset from the magnet 301A on the driven blade set 101A. The magnetic force between the magnet 303 and the magnet 301A is in a direction that attracts them to be in an aligned configuration. This force can be used to generate a magnetic detent torque 800 (e.g., roughly 4 N*m) as shown in FIG. 8 that tends to hold it in the collapsed configuration.

Similarly, as shown in FIG. 3B, when in the deployed configuration the magnet 303 on the following blade set(s) 101B is slightly offset from the magnet 301A on the driven blade set 101A. The magnetic force between the magnet 303 and the magnet 301A is in a direction that attracts them to be in an aligned configuration. This force can be used to generate a magnetic detent torque 801 (e.g., −4 N*m) as shown in FIG. 8 that tends to hold it in the deployed configuration. The torque required to overcome the magnetic detent torque 800 and 801 may be a fraction of the torque required to generate full thrust from the lift fan, or it may be a larger amount.

Figure 7A:
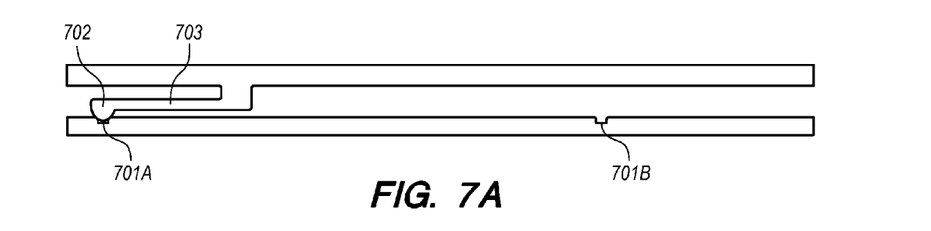
FIGS. 7A and 7B respectively illustrate detailed views of a lift fan deployment mechanism in the collapsed configuration and in the deployed configuration, using a mechanical latch detent according to one embodiment
Figure 7B:
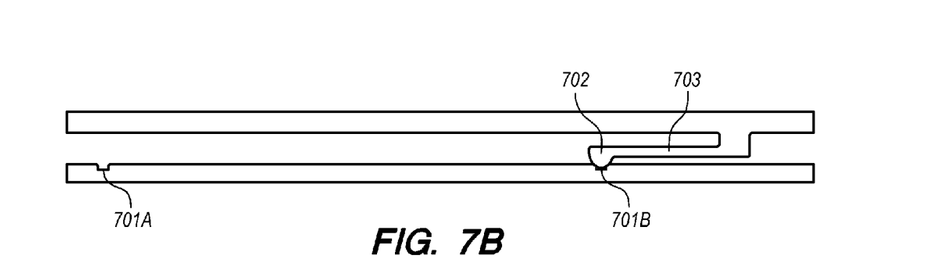

Another type of detent is a mechanical latch detent shown in FIGS. 7A and 7B. In one embodiment, the mechanical latch detent uses a spring or flexure 703 to preload a pawl 702 such that when the pawl 702 engages a groove 701A or 701B some threshold torque is required to be exceeded before relative motion can occur. FIG. 7A depicts the mechanical latch in the collapsed configuration, in which the pawl 702 is engaged with groove 701A, which is located such that the detent torque tends to keep the following blade set(s) 101B in the collapsed configuration.

FIG. 7B depicts the mechanical latch in the deployed configuration, in which the pawl 702 is engaged with a groove 701B, which is located such that the detent torque tends to keep the following blade set(s) 101B in the deployed configuration according to one embodiment. The grooves 701A and 701B, the pawl 702 and the flexure 703 may each be comprised of multiple copies distributed around the mechanism. In another embodiment, grooves 701A and 701B are included on the following blade set(s) 101B and the pawl 702 and flexure 703 are included on the driven blade set 101A.

When the lift fan is not used and is stationary with respect to the powered-lift aircraft, the lift fan would normally be in the collapsed configuration. When the lift fan is required to produce thrust, it is in the deployed configuration, and it spins within some nominal speed range depending on thrust required and other conditions. An example of a nominal operating speed range is from 2500 RPM to 3500 RPM. A motor applies torque to the lift fan in order to accelerate it from the stationary configuration to the desired operating speed. As the lift fan accelerates, the lift fan moves from the collapsed configuration to the deployed configuration before it reaches the lower bound of the operating speed range. The aerodynamic torque and inertia of the following blade set(s) 101B apply torque to the deployment mechanism in the direction that deploys the following blade set(s) 101B. When this torque exceeds the torque that resists relative motion between the driven and following blade sets (e.g. friction and/or detent torque), the following blade set(s) 101B will move with respect to the driven blade set. In some embodiments, the deployment torque profile is designed such that the following blade set(s) 101B moves from the collapsed configuration to the deployed configuration before the lift fan reaches the lower limit of the nominal operating speed range. In some embodiments the deployment torque is produced by an electric motor that provides the power to spin the lift fan. In some embodiments the torque of the electric motor can be precisely controlled to create the desired deployment torque profile.

As an example of how the deployment torque profile could be designed, assume that the following blade set(s) 101B requires a quadratic amount of torque with respect to its rotational speed and that 10 N*m of torque is required when it is spun at 2000 RPM, regardless of its relative position with respect to the driven blade set 101A. The mechanism may be designed to include 10 N*m of friction, regardless of the speed of the following blade set(s) 101B. If the lift fan were slowly spun up to and held at 2100 rpm, the aerodynamic torque on the following blade set(s) 101B would overcome the friction of the mechanism and the following blade set(s) 101B would accelerate until it contacts the mechanical stop that defined the deployed configuration. This method will be referred to as the "aero method" according to one embodiment.

As another example, the deployment torque profile could be designed such that a large amount of torque would be applied, causing the rotational inertia load of the following blade set(s) 101B to exceed the friction of the mechanism. This method will be referred to as the "inertial method" according to one embodiment. This torque would need to be applied for a long enough time for the following blade set(s) 101B to move all the way from the collapsed configuration to the deployed configuration.

The collapsing torque profile can be designed in a similar way using either the aero or inertial method, except that if the aero method were used for collapsing, the lift fan would need to spin in the opposite direction from normal operation. If this is not desirable, the inertial method could be used and the inertial load would need to be such that it overcomes both the mechanism retention torque and the aero torque. There are many variations on deployment and collapsing torque profiles that may combine aspects of either the aero or inertial methods.

Figure 4:
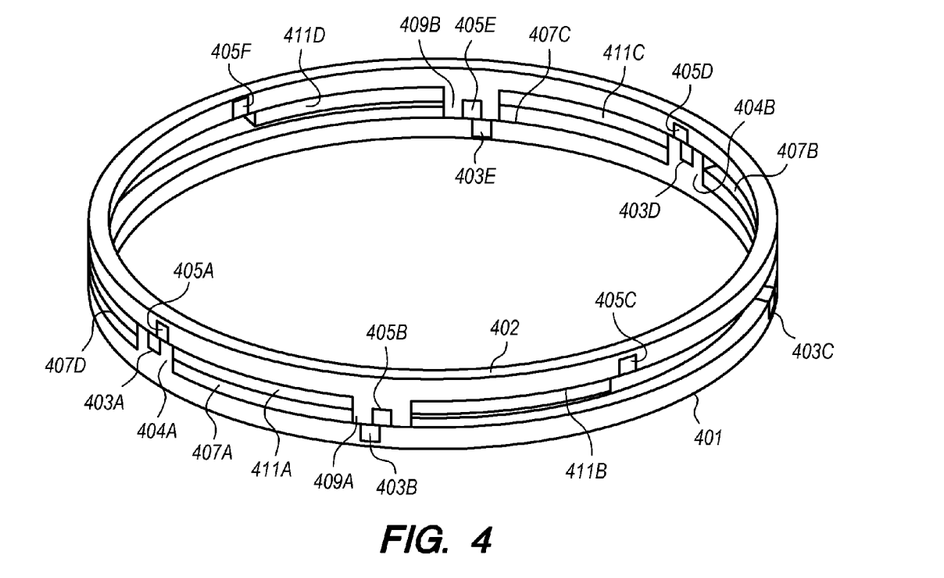
FIG. 4 illustrates a detailed view of the deployment mechanism of the lift fan according to one embodiment.

FIG. 4 illustrates a detailed view of mechanical rings attached to the driven blade set 101A and following blade set(s) 101B that position the blade sets in the deployed and collapsed configurations according to one embodiment. The mechanical rings incorporate magnetic detents similar to those described in FIGS. 3A and 3B used in collapsed and deployed configurations as will be further described below.

Particularly, a first ring 401 is attached to the driven blade set 101A using fasteners such as screws or other fastening means and a second ring 402 is attached to the following blade set(s) 101B using fasteners. The first ring 401 comprises for example a plurality of magnets 403A, 403B, 403C, 403D, and 403E and the second ring 402 comprises a plurality of magnets 405A, 405B, 405C, 405D, 405E, and 405F. Note that in other embodiments, different numbers of magnets may be used in the first ring 401 and the second ring 402. The number of magnets used is determined by the desired amount of retention torque and packing considerations to fit the mechanism in a particular desired volume. Each of the plurality of magnets 403 of the first ring 401 is attracted to a corresponding one of the plurality of magnets 405 of the second ring 402 when in the collapsed configuration and in the deployed configuration. That is, each magnetic in the first ring 401 and the second ring 402 is attracted to a different magnet on the opposite ring when in the deployed configuration and the collapsed configuration. The magnetic attraction between each pair of magnets applies a counterclockwise torque to the first ring 401 and a clockwise torque to the second ring 402 to maintain either the collapsed configuration or the deployed configuration. When in the deployed configuration, the magnetic attraction between each pair of magnets applies a counterclockwise torque to the first ring 401 and a clockwise torque to the second ring 402 to maintain the mechanism in the deployed configuration.

In one embodiment, the mechanical rings each include a plurality of mechanical tabs and a plurality of mechanical stops. As shown in FIG. 4, the first ring 401 comprises mechanical tabs 404A and 404B and mechanical stops 407A, 407B, 407C, and 407D. Similarly, the second ring 402 includes mechanical tabs 409A and 409B and mechanical stops 411A, 411B, 411C, and 411D. The mechanical tabs 409 and the mechanical stops 407 prevent the second ring 402 from moving (i.e., rotating) any further in the clockwise or counterclockwise direction with respect to the first ring 401 when the mechanical tabs 404 and 409 respectively contact the mechanical stops 407 and 411. Each mechanical tab includes a corresponding magnetic detent. In one embodiment, the mechanical stops 407 are made of high impact plastic (e.g., ultra-high-molecular-weight (UHMW) polyethylene plastic) or other high impact resistant materials and the mechanical rings are made of aluminum, steel, titanium, carbon fiber, or other materials. The mechanical stops 407 may be fastened to the mechanical rings using fasteners, for example screws.

Figure 5:
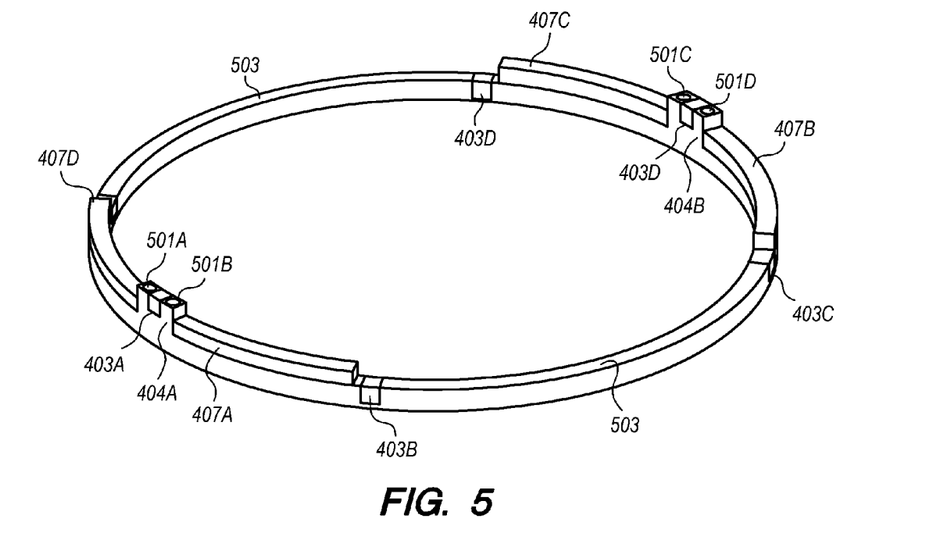
FIG. 5 illustrates a detailed view of the portion of the deployment mechanism coupled to the driving blade set of the lift fan according to one embodiment.

FIG. 5 illustrates a detailed view of the first ring 401 coupled to the driven blade set 101A. As shown in FIG. 5, the first ring 401 comprises the plurality of magnets 403, the plurality of mechanical tabs 404, and the plurality of mechanical stops 407 as previously described above. As shown in FIG. 5, each mechanical tab 404 protrudes from the first ring 401. A mechanical stop 403 is attached to the first ring 401 at each side of the mechanical tab 404. For example, mechanical stop 407A is attached to the first ring 401 at one side of the mechanical tab 404A and mechanical stop 407D is attached to the first ring 401 at the other side of the mechanical tab 404A. The mechanical stops 407 may be attached to the first ring 401 using fasteners such as screws. The mechanical stops 407 prevent the second ring 407 from over rotating when each mechanical tab 409 of the second ring 402 contacts a corresponding mechanical stop 407 of the first ring 401.

In one embodiment, each mechanical tab 404 includes a plurality of spring loaded ball plungers (e.g., 4 spring loaded ball plungers) 501. Specifically, in the illustrated embodiment mechanical tab 404A includes spring loaded ball plungers 501A and 501B. Spring loaded ball plunger 501A is positioned at one end of the mechanical tab 404A and the spring loaded ball plunger 501B is positioned at the other end of the mechanical tab 404A. Magnet 403A is located between the spring loaded ball plungers 501A and 501B in one embodiment. Similarly, mechanical tab 404B includes spring loaded ball plungers 501C and 501D. Spring loaded ball plunger 501C is positioned at one end of the mechanical tab 404B and the spring loaded ball plunger 501D is positioned at the other end of the mechanical tab 404B. Magnet 403D is located between the spring loaded ball plungers 501C and 501D in one embodiment.

The spring loaded plungers 501 of the first ring 401 roll on a surface of the second ring 402 corresponding to the surface 503 of the first ring 401 shown in FIG. 5. Particularly, the spring-loaded plungers 501 of the first ring 401 roll on the surface of the second ring 402 during deployment and collapsing of the following blade set(s) 101B. The surface 503 of the first ring is located between a pair of mechanical stops 407A and 407B of the first ring. Similarly, the surface of the second ring is located between a pair of mechanical stops of the second ring.

In one embodiment, the ball plungers 501 also apply an axial preload that pushes the first ring 401 and the second ring 402 apart and applies load on a high friction thrust pad 900. The friction generated by the thrust pad provides damping which slows the dynamics of the first ring 401 and the second ring 402 during the collapsing and deployment actions. Slowing the collapsing and deployment actions reduces the speed at which the mechanical tabs of the first ring 401 or second ring 402 contacts the mechanical stops of the opposite ring. This reduces the shock loads experienced by the lift fan and reduces any oscillating or bouncing on the mechanical stops that may occur due to unsteady aerodynamic loads. Note that the second ring 402 includes similar features as the first ring 401 described in FIG. 5.

Figure 6A:
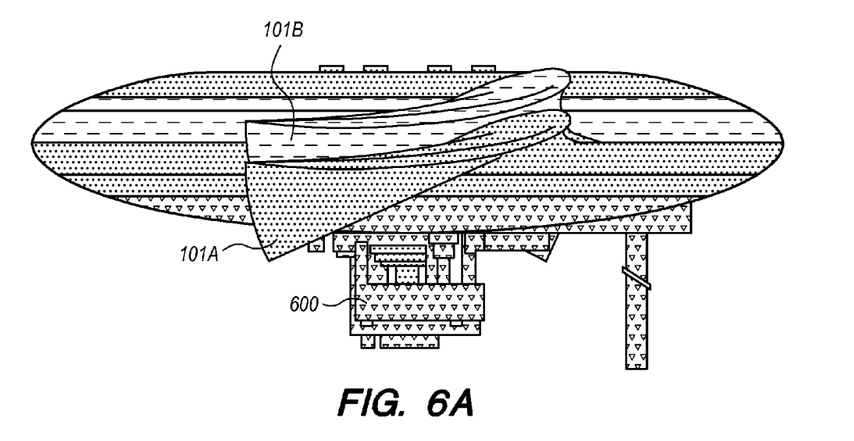
FIG. 6A shows the fan, including the blades, in the collapsed configuration.

Generally, FIG. 6A illustrates a lift fan that incorporates a deployment mechanism according to one embodiment. In particular, FIG. 6A illustrates a lift fan, including the blades, in the collapsed configuration according to one embodiment. The lift fan assembly incorporates the mechanical rings coupled to the driven blade set 101A and following blade set 101B of the lift fan. Note that the mechanical rings are not shown in FIG. 6A as they are obscured in the figure by the fan blades of the driven blade set 101A and the following blade set 101B. The lift fan assembly further comprises a motor 600 that couples the lift fan assembly to the aircraft. The motor 600 may be an electric motor, internal combustion engine, hydraulic actuator, or any other type of actuator that can apply torque to the lift fan.

Figure 6B:
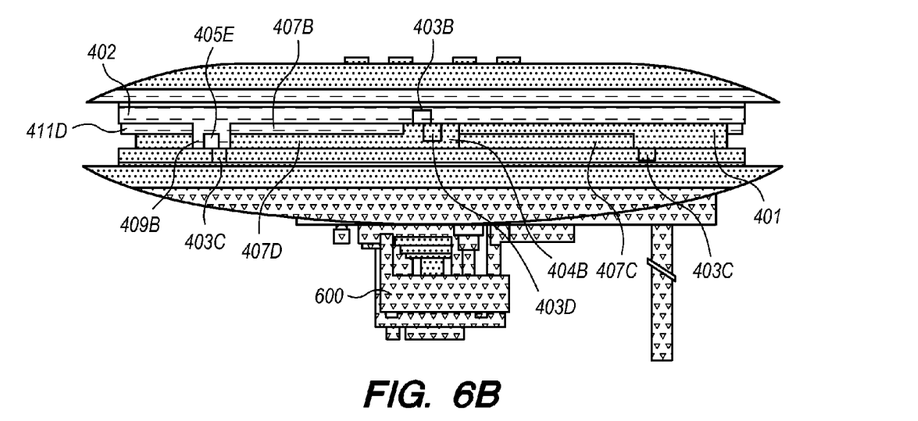
FIG. 6B shows the fan, without the blades, in the collapsed configuration.

Generally, FIG. 6B shows the fan, without the blades, in the collapsed configuration. In particular, FIG. 6B illustrates the collapsed fan assembly shown in FIG. 6A with the fan blades removed to illustrate the position of the mechanical rings 401 and 402 in the collapsed configuration. In the collapsed configuration, the mechanical stop 407D of the first ring 401 is in contact with the mechanical tab 409B of the second ring 402. Similarly, the mechanical stop 407B of the second ring 402 is in contact with the mechanical tab 404B of the first ring 401 in the collapsed configuration. The magnetic attraction between the magnet 403D of the first ring 401 and the magnet 403B of the second ring 402 and the magnetic attraction between the magnet 403C of the first ring 401 and the magnet 405E of the second ring 402 maintain the collapsed configuration of the lift fan. Note that the magnetic attraction of another pair of magnets on the opposite side of the lift fan assembly not shown in FIG. 6B contribute to maintaining the collapsed configuration of the lift fan.

Figure 6C:
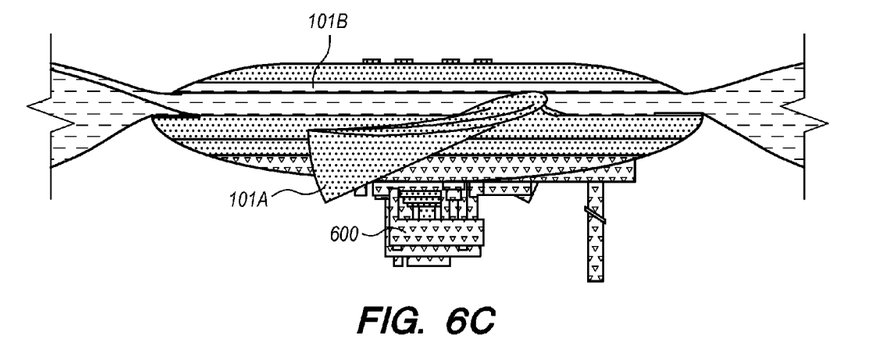
FIG. 6C shows the fan, including the blades, in the deployed configuration.

Generally, FIG. 6C shows the fan, including the blades, in the deployed configuration. In particular, inn FIG. 6C, the following blade set 101B has rotated until the deployed configuration is reached as defined by position of the mechanical rings shown in FIG. 6D. Similar to FIG. 6A, the mechanical rings are not shown in FIG. 6C as they are obscured by the fan blades of the driven blade set 101A and the following blade set 101B.

Figure 6D:
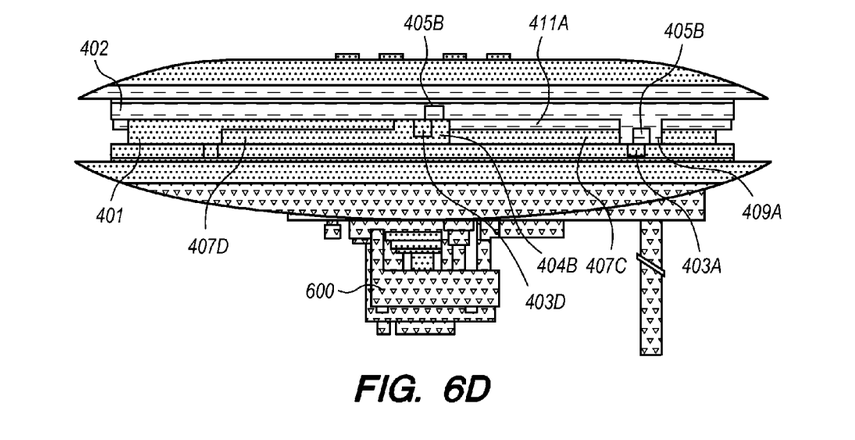
FIG. 6D shows the fan, without the blades, in the collapsed configuration.

Generally, FIG. 6D shows the fan, without the blades, in the collapsed configuration. In particular, FIG. 6D illustrates the deployed fan assembly shown in FIG. 6C with the fan blades removed to show the position of the mechanical rings 401 and 402 in the deployed configuration. In the deployed configuration, mechanical stop 407C of the first ring 401 is in contact with mechanical tab 409A of the second ring 401. Similarly, the mechanical stop 411A of the second ring 402 is in contact with the mechanical tab 404B of the first ring 401 in the deployed configuration. The magnetic attraction between the magnet 403D of the first ring 401 and the magnet 405B of the second ring 402 and the magnetic attraction between the magnet 403A of the first ring and the magnet 405B of the second ring maintain the deployed configuration of the lift fan. Note that the magnetic attraction of another pair of magnets on the opposite side of the lift fan assembly not shown in FIG. 6D contribute to maintaining the deployed configuration of the lift fan.

Although this description has been provided in the context of specific embodiments, those of skill in the art will appreciate that many alternative embodiments may be inferred from the teaching provided. Furthermore, within this written description, the particular naming of the components, capitalization of terms, the attributes, data structures, or any other structural or programming aspect is not mandatory or significant unless otherwise noted, and the mechanisms that implement the described invention or its features may have different names, formats, or protocols. Further, some aspects of the system may be implemented via a combination of hardware and software or entirely in hardware elements. Also, the particular division of functionality between the various system components described here is not mandatory; functions performed by a single module or system component may instead be performed by multiple components, and functions performed by multiple components may instead be performed by a single component. Likewise, the order in which method steps are performed is not mandatory unless otherwise noted or logically required.

Unless otherwise indicated, discussions utilizing terms such as "selecting" or "computing" or "determining" or the like refer to the action and processes of a computer system, or similar electronic computing device, that manipulates and transforms data represented as physical (electronic) quantities within the computer system memories or registers or other such information storage, transmission or display devices.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

What is claimed is:

1. A lift fan mechanism comprising:
a first blade set comprising one or more fan blades, driven to rotate about an axis;
one or more additional blade sets each comprising one or more fan blades that are constrained to rotate about the axis of the first blade set, the one or more additional blade sets rotating independently from the first blade set below a threshold speed and the one or more additional blade sets rotating in conjunction with the first blade set above the threshold speed;
a plurality of mechanical stops that restrict a relative rotation between the first blade set and the one or more additional blade sets between a first position and a second position of the first blade set and the one or more additional blade sets, wherein the lift fan mechanism is in a collapsed configuration in the first position and the lift fan mechanism is in a deployed configuration to provide thrust in the second position;
a drive motor coupled to the first blade set, the drive motor configured to apply torque to the first blade set that is required to rotate the first blade set and the one or more additional blades sets to a speed that is required for an aircraft to achieve vertical flight, wherein the first blade set moves the one or more additional blade sets from the collapsed configuration to the deployed configuration responsive to the first blade set exceeding the threshold speed as the first blade set increases in speed until the required speed for the aircraft to achieve vertical flight is achieved.

2. The lift fan mechanism of claim 1, further comprising a friction pad between the first blade set and the one or more additional blade sets, the friction pad providing a retention torque that resists the relative rotation between the first blade set and the one or more additional blade sets.

3. The mechanism of claim 2, wherein the friction pad is preloaded by a plurality of spring ball plungers or a flexure.

4. The mechanism of claim 2, wherein the friction pad is loaded on the one or more additional blade sets by means of the lift generated by the one or more additional blade sets.

5. The lift fan mechanism of claim 1, further comprising:
a detent mechanism that provides retention force when the one or more additional blade sets is in at least the deployed configuration or the collapsed configuration.

6. The lift fan mechanism of claim 5, wherein the retention force is generated by an interaction of magnets included in the first blade set and the one or more additional blade sets.

7. The lift fan mechanism of claim 5, wherein the first blade set includes a groove and the one or more additional blade sets include a spring loaded pawl, wherein a detent torque is generated by the spring loaded pawl and the groove when the spring loaded pawl is positioned in the groove.

8. The lift fan mechanism of claim 1, wherein the lift fan mechanism transitions from the deployed configuration to the collapsed configuration responsive to the first blade set accelerating below the threshold speed.

9. The lift fan mechanism of claim 6, wherein the magnets are neodymium magnets.

10. The lift fan mechanism of claim 1, wherein the first blade set and the one or more additional blade sets each include two-bladed fans.

11. The lift fan mechanism of claim 1, wherein the deployed configuration corresponds to a position of the one or more additional blade sets with respect to the first blade set for producing thrust when the first blade set and the one or more additional blade sets rotate.

12. The lift fan mechanism of claim 1, wherein the drive motor is an electric motor.

13. The lift fan mechanism of claim 1, wherein the one or more additional blade sets includes a second blade set.

14. The lift fan mechanism of claim 1, wherein the one or more additional blade sets includes a third blade set and a fourth blade set.

15. A vertical takeoff and landing aircraft comprising:
a plurality of lift fan mechanisms, each lift fan mechanism including:
a first blade set comprising one or more fan blades driven to rotate about an axis;
one or more additional blade sets each comprising one or more fan blades that are constrained to rotate about the axis of the first blade set, the one or more additional blade sets rotating independently from the first blade set below a threshold speed and the one or more additional blade sets rotating in conjunction with the first blade set above the threshold speed;
a plurality of mechanical stops that restrict a relative rotation between the first blade set and the one or more additional blade sets between a first position and a second position of the first fan and the one or more additional blade sets, wherein the lift fan mechanism is in a collapsed configuration in the first position and the lift fan mechanism is in a deployed configuration to provide thrust in the second position;
a drive motor coupled to the first blade set, the drive motor configured to apply torque to the first blade set that is required to rotate the first blade set and the one or more additional blades sets to a speed that is required for an aircraft to achieve vertical flight, wherein the first blade set moves the one or more additional blade sets from the collapsed configuration to the deployed configuration responsive to the first blade set exceeding the threshold speed as the first blade set increases in speed until the required speed for the aircraft to achieve vertical flight is achieved.

16. The vertical takeoff and landing aircraft of claim 15, wherein the one or more additional blade sets includes a second blade set.

17. The vertical takeoff and landing aircraft of claim 15, wherein the one or more additional blade sets includes a third blade set and a fourth blade set.

18. The vertical takeoff and landing aircraft of claim 15, wherein each lift fan mechanism further includes:
a detent mechanism that provides retention force when the one or more additional blade sets is in at least the deployed configuration or the collapsed configuration.

19. A lift fan mechanism comprising:
a first blade set comprising one or more fan blades, driven to rotate about an axis;
one or more additional blade sets each comprising one or more fan blades that are constrained to rotate about the axis of the first blade set, the one or more additional blade sets rotating independently from the first blade set;

a plurality of mechanical stops that restrict a relative rotation between the first blade set and the one or more additional blade sets between a first position and a second position of the first blade set and the one or more additional blade sets, wherein the lift fan mechanism is in a collapsed configuration in the first position and the lift fan mechanism is in a deployed configuration to provide thrust in the second position;

a drive motor coupled to the first blade set, the drive motor configured to apply torque to the first blade set that is required to rotate the first blade set and the one or more additional blades sets to a speed that is required for an aircraft to achieve vertical flight, wherein the first blade set moves the one or more additional blade sets from the collapsed configuration to the deployed configuration responsive to the first blade set exceeding a threshold acceleration as the first blade set increases in speed until the required speed for the aircraft to achieve vertical flight is achieved.

20. The lift fan mechanism of claim 19, further comprising:

a friction pad between the first blade set and the one or more additional blade sets, the friction pad providing a retention torque that resists the relative rotation between the first blade set and the one or more additional blade sets; and a detent mechanism that provides retention force when the one or more additional blade sets is in at least the deployed configuration or the collapsed configuration.

21. The lift fan mechanism of claim 19, wherein the lift fan mechanism transitions from the deployed configuration to the collapsed configuration responsive to the first blade set accelerating below the threshold acceleration.

* * * * *